United States Patent [19]
Kukkal et al.

[11] Patent Number: 5,774,117
[45] Date of Patent: Jun. 30, 1998

[54] METHOD AND APPARATUS FOR EXCHANGING ELECTRONIC BUSINESS CARDS IN A POINT-TO-POINT OR A MULTI-POINT PERSONAL COMPUTER CONFERENCE

[75] Inventors: Puneet Kukkal, Hillsboro; Dale Boss; Sridhar Iyengar, both of Beaverton, all of Oreg.

[73] Assignee: Intel Corporation, Santa Clara, Calif.

[21] Appl. No.: 535,628

[22] Filed: Sep. 29, 1995

[51] Int. Cl.[6] ................................................. G06T 11/00
[52] U.S. Cl. ............................................................. 345/330
[58] Field of Search .................................... 395/329–332, 395/327, 328, 806, 807

[56] References Cited

U.S. PATENT DOCUMENTS 5,452,299  9/1995  Thessin et al. ........................... 370/62
5,506,954  4/1996  Arshi et al. .............................. 345/501
5,600,827  2/1997  Nakabayashi et al. ................. 395/602

Primary Examiner—Almis R. Jankus
Attorney, Agent, or Firm—Blakely, Sokoloff, Taylor & Zafman

[57] ABSTRACT

The conference manager of a general purpose personal conference application is enhanced, including a request management and a send/receive function for exchanging "business cards" electronically using a two-phase approach, a request phase and an answer phase. While request for another participant is automatic responsive to a connect/joint event, answering a request is conditionally depending on whether the receiving system is "in conference". The external manifestation of an electronic "business card" (bizcard) is a visual presentation of information commonly found on physical business cards in a format that resembles a physical business card. Preferably, the visual presentation also includes a picture of the person named. Internally, the information including the data necessary to render the picture are maintained in data structures.

15 Claims, 8 Drawing Sheets

METHOD AND APPARATUS FOR EXCHANGING ELECTRONIC BUSINESS CARDS IN A POINT-TO-POINT OR A MULTI-POINT PERSONAL COMPUTER CONFERENCE

BACKGROUND OF THE INVENTION

1. Field of the Invention

The present invention relates to the field of personal computer (PC) conferencing. More specifically, the present invention relates to the exchange of electronic business cards among conference participants of a point-to-point or a multi-point computer conference.

2. Background Information

As advances in telecommunication and computing technology continue to bring forth more powerful PC conferencing systems, both users and system integrators desire closer modeling of participant behaviors of traditional face-to-face conferences in PC conferences. One particular behavior of interest is the practice of conference participants exchanging business cards in face-to-face conferences. The business cards not only serve as vehicles of introduction, they also serve as information sources. It is not uncommon for conference participants to save the exchanged business cards and refer to them later on.

The conference participants may refer to the saved business cards for a variety of reasons. Sometimes, the conference participants may be referring to the saved business cards simply to remind them of the persons they met, including the fellow participant's affiliations, titles, etc. Other times, the conference participants may be referring to the saved business cards to figure out the roles, the interests, etc. of the fellow participants in attending particular conferences or advocating particular points of views, through the affiliations, titles etc. information. Yet other times, the conference participants may be referring to the saved business cards as a resource for someone to whom they themselves can turn or refer colleagues, clients etc. to consult on certain subject matters.

In sum, notwithstanding the limited amount of information typically contained in a business card, its utility is amazingly broad. In fact, it is a common practice for professionals in a variety of disciplines to routinely enter the information in business cards into their address databases for subsequent retrieval for the purposes described earlier, and/or for mailing of announcements, seasonal greeting cards etc.

Thus, it is desirable to be able to model business card exchanges for conference participants of a PC conference. It is further desirable to be able to capture the information in the exchanged "business cards" for subsequent retrieval. Copending U.S. patent application, Ser. No. 08/444,020, entitled Method And Apparatus For Exchanging Electronic Business Cards In A Point-to-Point or Multi-Point Personal Computer Conference PENDING discloses a method and apparatus that achieve these and other desirable results. The disclosed method and apparatus teach the employment and exchange of a data structure containing information that are commonly found in business cards, and the rendering of the information in a business card like format. These data structures are referred to as "bizcards". Furthermore, the disclosed method and apparatus teach the automatic exchange of these bizcards at the time participants join a conference.

The automatic exchange works well for PC conferences wherein the relative performance of the conferencing PCs are substantially the same. For these conferences, all participating PCs will complete their connection processing at relatively the same time. Thus, it is unlikely for a PC to receive one of these bizcards and not knowing what to do with it, because the connection processing of the particular PC has not been completed.

However, as PC conferencing become more widely accepted and used by more users, and not "exclusively" practiced by the most sophisticated users only, it is expected the relative performance differences among potential conferencing PCs will grow wider. Thus, the odds of a PC receiving a bizcard and not knowing what to do with it, because it has not completed its connection processing will increase, resulting in loss of data and less reliable modeling of the business card exchange behavior in a face-to-face conference. Thus, it is desirable to have an alternative approach to exchanging bizcards among the conference participants of a PC conference. As will be described in more detail below, the method and apparatus of the present invention achieves these and other desirable results.

SUMMARY OF THE INVENTION

The conference manager of a general purpose personal conference (GPPC) application is enhanced, including the provision of first request management and send/receive functions for exchanging bizcards with other conference participants of a computer conference using a two-phase approach, thereby allowing the business card exchange behavior of conference participants of face-to-face conferences to be modeled more reliably even among PCs with wider differences in processing power.

The external manifestation of a bizcard is a visual presentation of information commonly found on physical business cards in a format that resembles a physical business card. Preferably, the visual presentation also includes a picture of the person named. Internally, the information including the data necessary to render the picture are maintained in data structures, thereby allowing the information captured to be searchable for subsequent retrieval.

More specifically, the conference manager is enhanced to automatically request a connecting or a joining participant's bizcard, responsive to each participant connecting or joining event. A request management function is used to manage bizcard requests received from other conference participants. All requests received prior to the GPPC application entering an "in conference" state are queued, and all previously queued requests are processed when the GPPC application enters the "in conference" state. A send/receive function is used to send and receive bizcards between the user and other conference participants, in cooperation with the request management function.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1A:
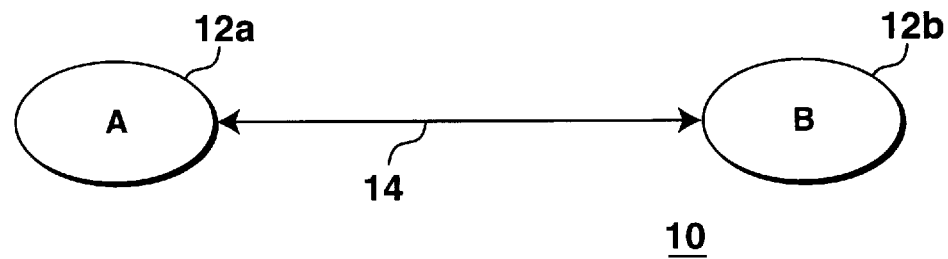
FIG. 1a & 1b illustrate a typical point-to-point and a typical multipoint PC conference incorporating the teachings of the present invention.
Figure 1B:
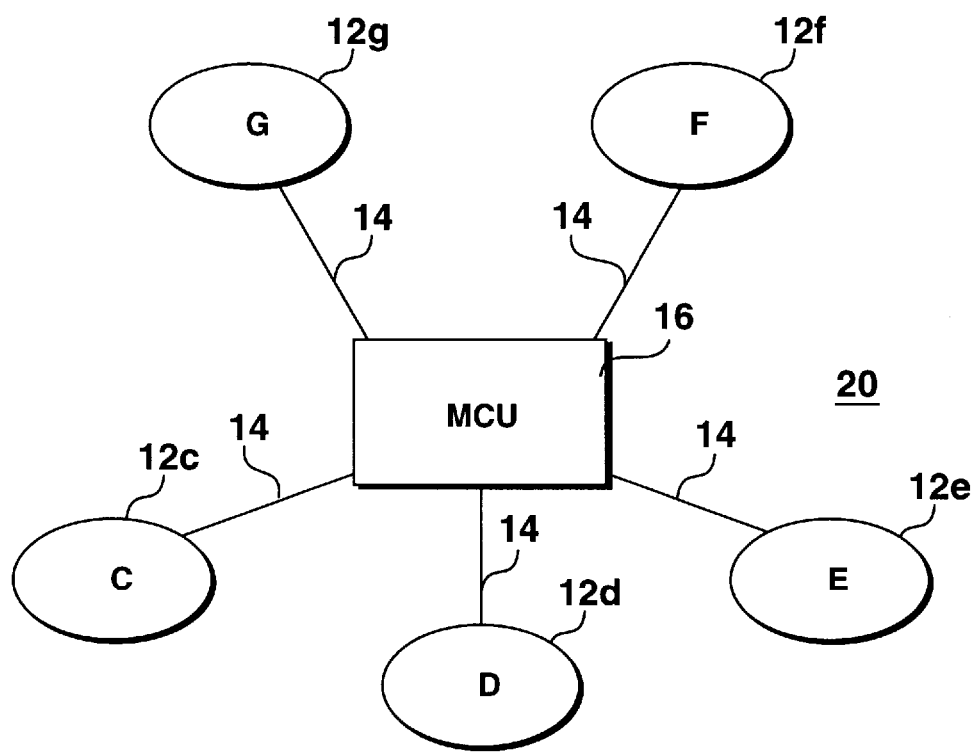

Referring now to FIG. 1a & 1b, two exemplary networks of PC conferencing systems incorporated with the teachings of the present invention are illustrated. FIG. 1a illustrates an exemplary point-to-point PC conferencing system 10, whereas FIG. 1b illustrates an exemplary multi-point PC conferencing system 20. Point-to-point PC conferencing system 10 comprises PC A & B 12a and 12b connected to each over via POTS, ISDN or LAN 14, whereas multi-point PC conferencing system 20 comprises PC C-G 12c–12g and multi-point control unit (MCU) 16 connected to each other via ISDN 14. PC A 12a and PC B 12b are joined together in conference when one of the two PC's 12a or 12b call the other. PC C-G 12c–12g are joined together in conference via MCU 16 when PC's 12c–12g individually call MCU 16.

While for ease of explanation, exemplary multi-point PC conferencing system 20 is illustrated with all PC C-G 12c–12g joined in conference via one MCU 16, based on the description to follow, it will be appreciated that the present invention may be practiced with multi-point PC conferencing system employing one or more MCU's 16. Furthermore, MCU 16 may be managing multiple multi-point PC conferences.

PC A-G 12a–12g and MCU 16 are all equipped with relative high performance processors having sufficient computing power for processing digitized audio and video data in real time. However, under the present invention, PC A-G 12a–12g may be equipped with processors from different performance classes having greater differences in computing power. Additionally, each of PC A-G 12a–12g and MCU 16 is also equipped with communication interface(s) and storage medium. PC A-G 12a–12g are further equipped with audio/video subsystems. Communication interfaces, storage medium, and audio/video subsystems may be implemented with any number of such elements well known in the art.

MCU 16 is equipped with multi-point control software having capabilities similar to MCUs employed in AT&T's WorldWorx™ service provided by AT&T of New Jersey. PC A-G 12a–12g are all equipped with identical general purpose personal conference (GPPC) applications incorporated with teachings of the present invention. Each GPPC application includes base conferencing functions similar to those offered by the ProShare™ Personal Conferencing System manufactured by the assignee of the present invention. Each GPPC application also includes extended conferencing functions for setting up, exchanging, saving, retrieving, and browsing bizcards, which will be described in more detail below. For a more detail description of AT&T's WorldWorx™ service and ProShare™, refer to their respective product literature's.

Figure 2:
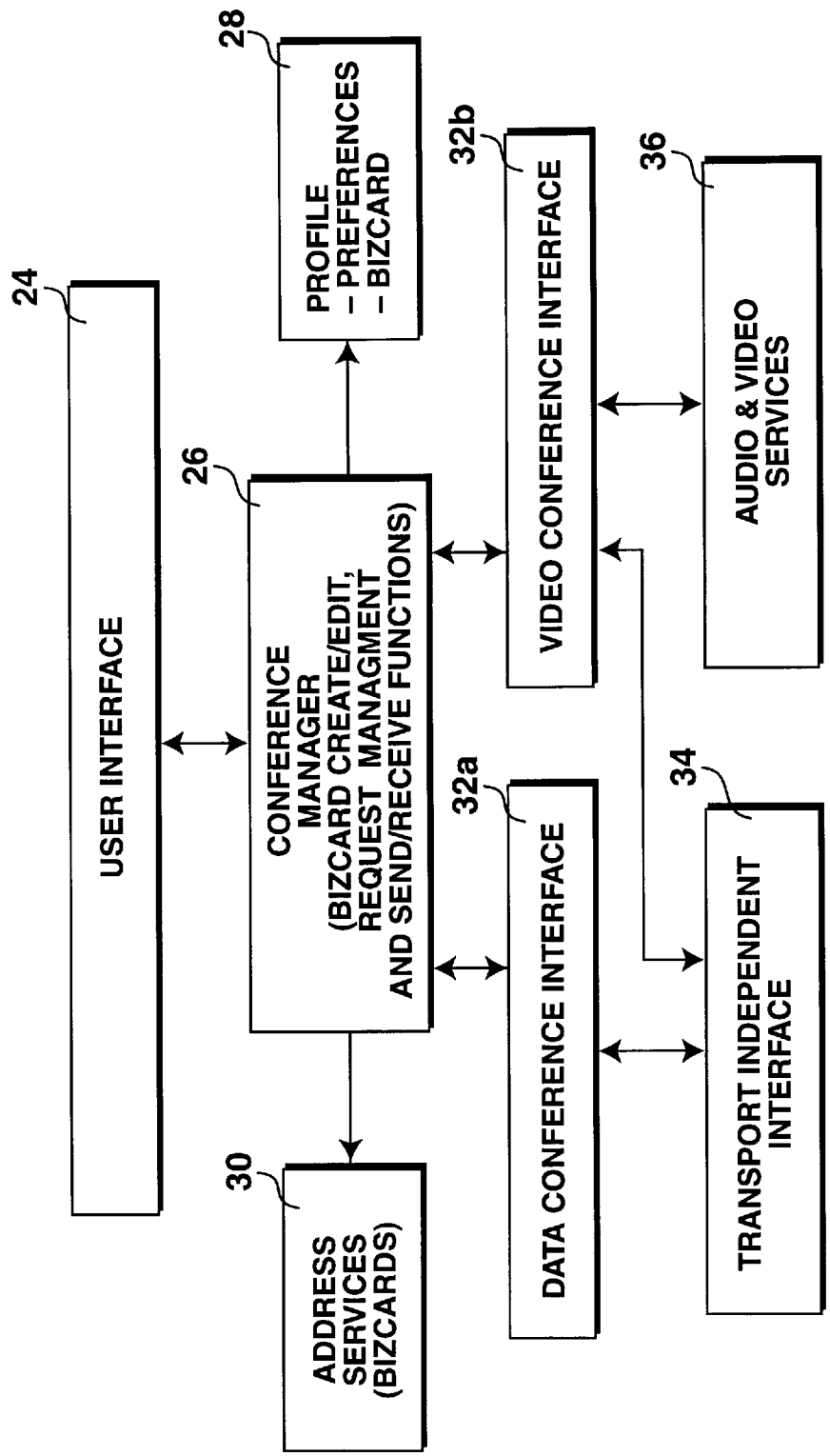
FIG. 2 illustrates one embodiment of a GPPC application incorporated in each of the PC's of FIG. 1a & 1b, including the request management and send/receive functions employed by the conference manager for implementing the two phase approach to exchanging bizcards of the present invention.

FIG. 2 illustrates one embodiment of a GPPC application incorporated with the teachings of the present invention in further detail. As shown, for this embodiment, GPPC application 22 comprises user interface 24, conference manager 26, profile data 28 and address services 30. Furthermore, GPPC application 22 comprises transport independent services 34, extended A/V services 36, and "integrated" data and video interfaces 32a and 32b to these services 34 and 36. In the presently preferred embodiment, GPPC application 22 is implemented in an object-oriented manner using the programming language C++.

User interface 24 provides display windows with menus, buttons etc. for interacting with a user. In particular, in accordance to the present invention, user interface 24 includes enhancements for facilitating set up, exchange, retrieval, browse and re-send of bizcards. Conference manager 26 manages personal conferences including the conferencing applications. In particular, conference manager 26 maintains a conference state denoting whether the PC conferencing system is "in conference" or not. Furthermore, conference manager 26 also includes a create/edit function for creating and editing a user's bizcard. Conference manager 26 also includes a request management and a send/receive function for implementing a two-phase approach to exchanging and saving bizcards between the user and other conference participants, in accordance to the present invention. Associated with the request management function is a request queue. Profile 28 stores various user preferences. In particular, profile 28 includes the user's bizcard and the user's preference on whether a received bizcard is to be displayed automatically. Address services 30 provide services related to managing connection addresses for conference participants. In particular, address services 30 include services for retrieving and browsing saved bizcards. These functions and services will be described in further detail below.

Transport independent services 34 provide connection services on multiple transport media and multiple connections. A/V services 36 provide sampling, digitization, compression/decompression of audio signals exchanged, as well as capture and playback services for video streams including interfacing with the proper CODEC to compress and decompress the video signals. Integrated data and video interfaces 32a and 32b provide abstraction of these transport and A/V services, enabling the serviced application to perform call management, data and/or file channel management, and A/V streams management. In one embodiment, integrated data interface 32a supports ITU's T120 protocol for data conferencing, whereas integrated video interface 32b supports ITU's H.320 protocol for video conferencing. These and other related services are known in the art, and therefore will not be described in further detail.

Figure 3A:
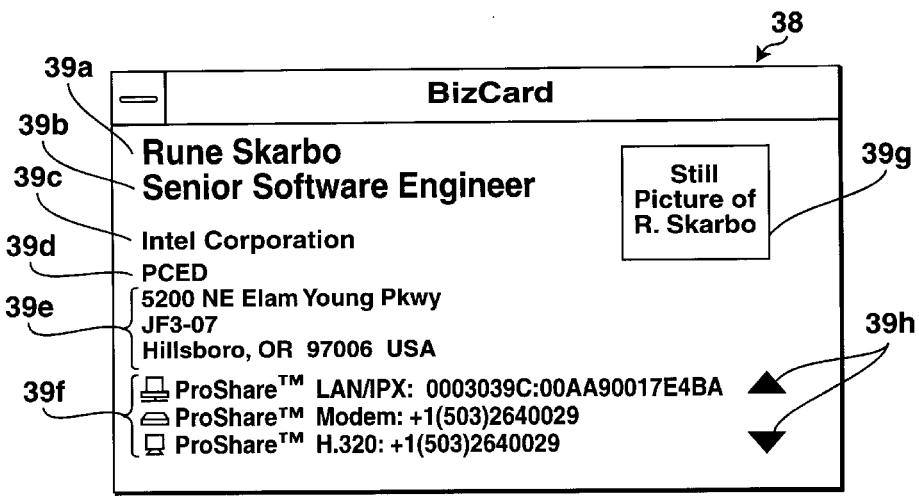
FIGS. 3a & 3b illustrate the external manifestation and internal representation of one embodiment of bizcard.
Figure 3B:
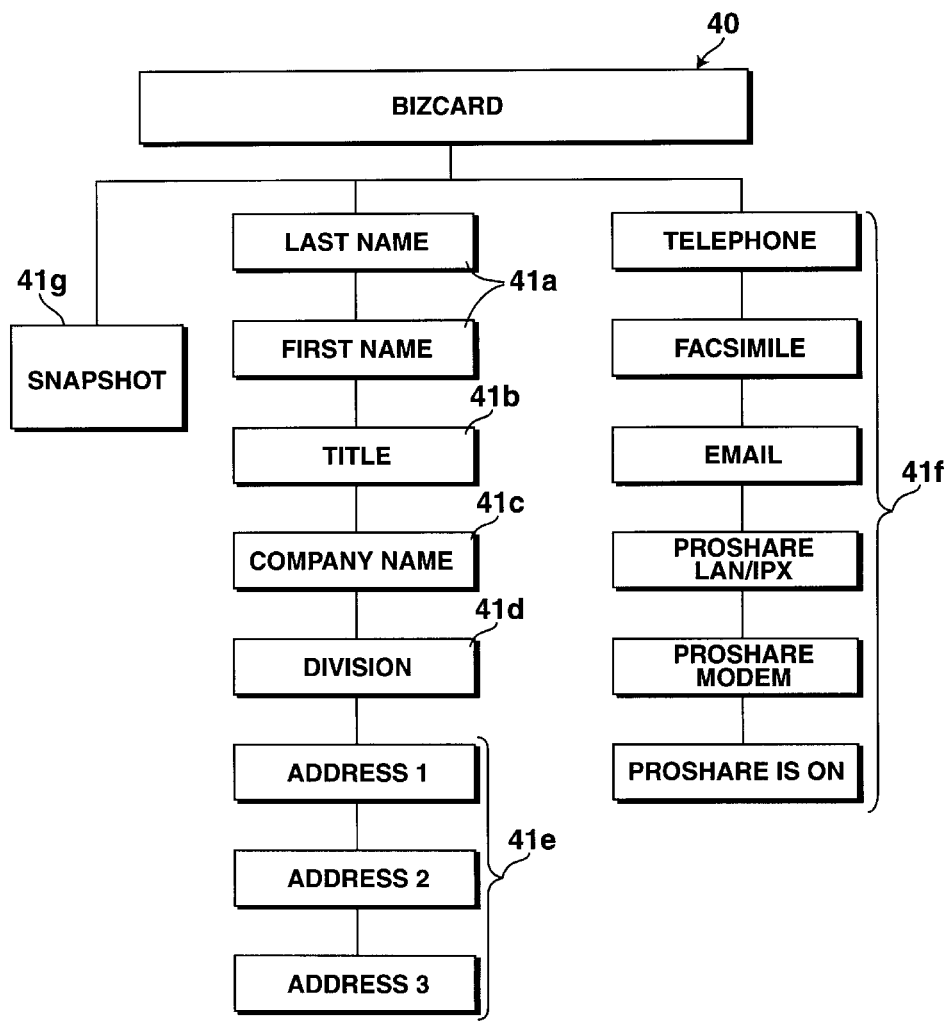

FIGS. 3a & 3b illustrate the external manifestation and internal representation of a bizcard. As shown in FIG. 3a, the external manifestation is a visual representation 38 of information commonly found on physical business cards in a format that resembles a physical business card. These information include name 39a, title 39b, company 39c, division 39d, address 39e, numbers 39f etc. Preferably, numbers 39f include all personal conferencing phone numbers/network addresses, in addition to conventional voice and facsimile phone numbers, and numbers 39f are scrollable, e.g. using up and down arrows 39h. Furthermore, the visual presentation 38 includes a picture 39g of the person named. Alternatively, a company logo may be included. As shown in FIG. 3b, internally, the information including the data necessary to render the picture 41g are maintained in data structures 40. Data structures 40 include data elements 41a–41g necessary to store the captured information. Data necessary to render the picture 41g may be stored in any number of graphics format well known in the art. The create/edit function of conference manager 26 for creating and editing user's bizcard 38, including its operational flow and end-user interfaces may be implemented in a variety of manners, including but not limited to the embodiment disclosed in the above identified co-pending patent application, which is hereby fully incorporated by reference.

Figure 4A:
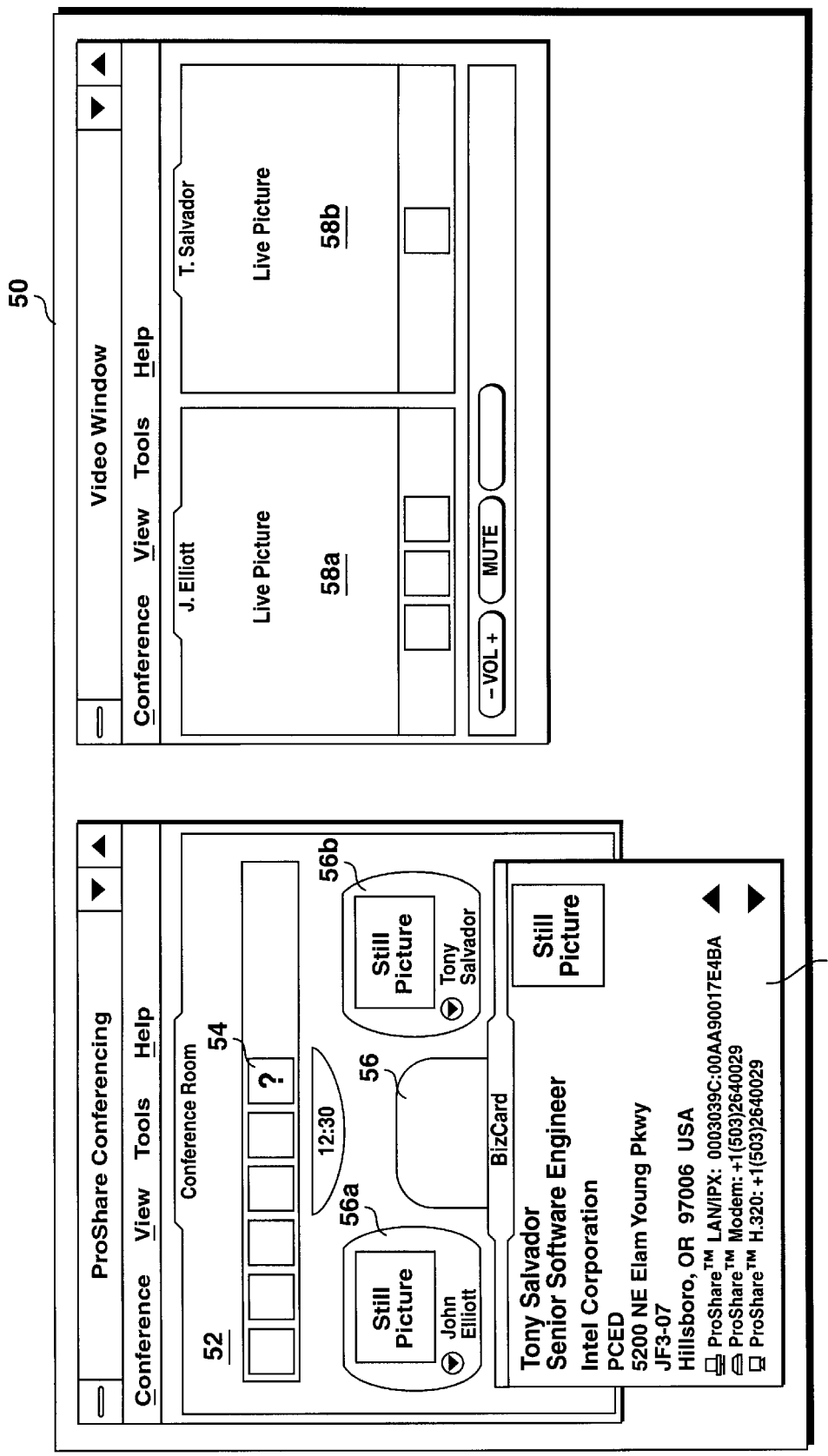
FIGS. 4a–4b illustrate one embodiment of the end user interfaces employed by the conference manager of FIG. 2 for rendering bizcards during operation.
Figure 4B:
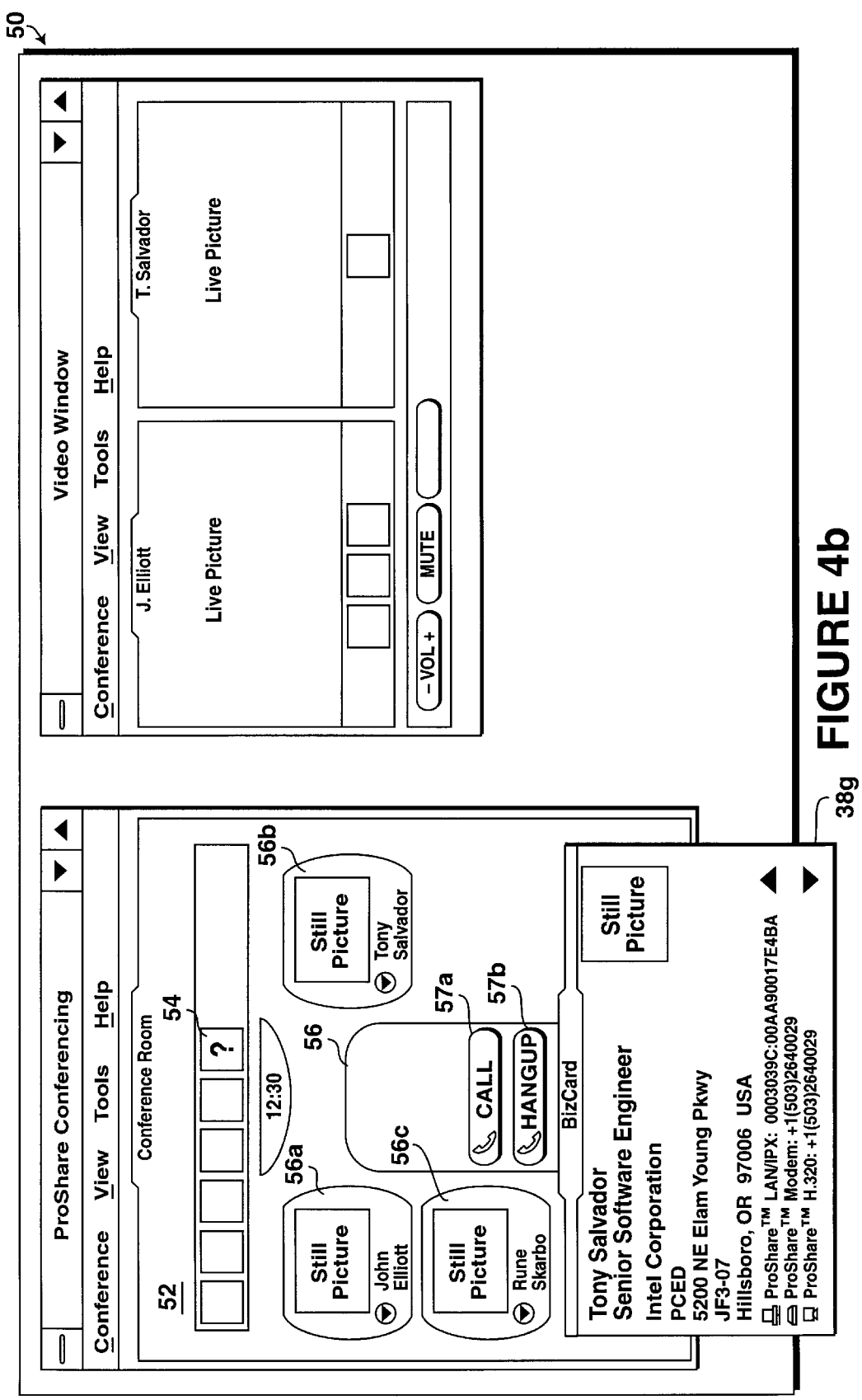

FIGS. 4a–4b illustrate one embodiment of the user interfaces employed for rendering bizcards. In particular, FIG. 4a illustrates the display of one conference participant's bizcard (Salvador) 38f at another conference participant's conference session window (Elliott) 50, when the two participants first joined together in conference. FIG. 4b illustrates the display of a "new" conference participant's bizcard (Skarbo) 38g at one of the existing conference participant's conference session window (Elliott) 50, when the "new" conference participant is joining a conference in progress (between Elliott and Salvador). As described earlier, bizcards 38f and 38g may be displayed automatically upon receipt, or bizcards 38f and 38g may be displayed upon request, using exemplary command button "?" 54, depending on the conference participant's preference setting. Preferably, notwithstanding an automatic display preference setting, exemplary command button "?" 54 may also be used to re-display the bizcard 38f or 38g of one of the conference participants, whenever the user is interested in doing so during the conference. The request management and send/receive functions of conference manager 26 for exchanging, rendering and saving bizcards 38 in accordance to the two-phase approach of the present invention will be described in more detail below.

Figure 5:
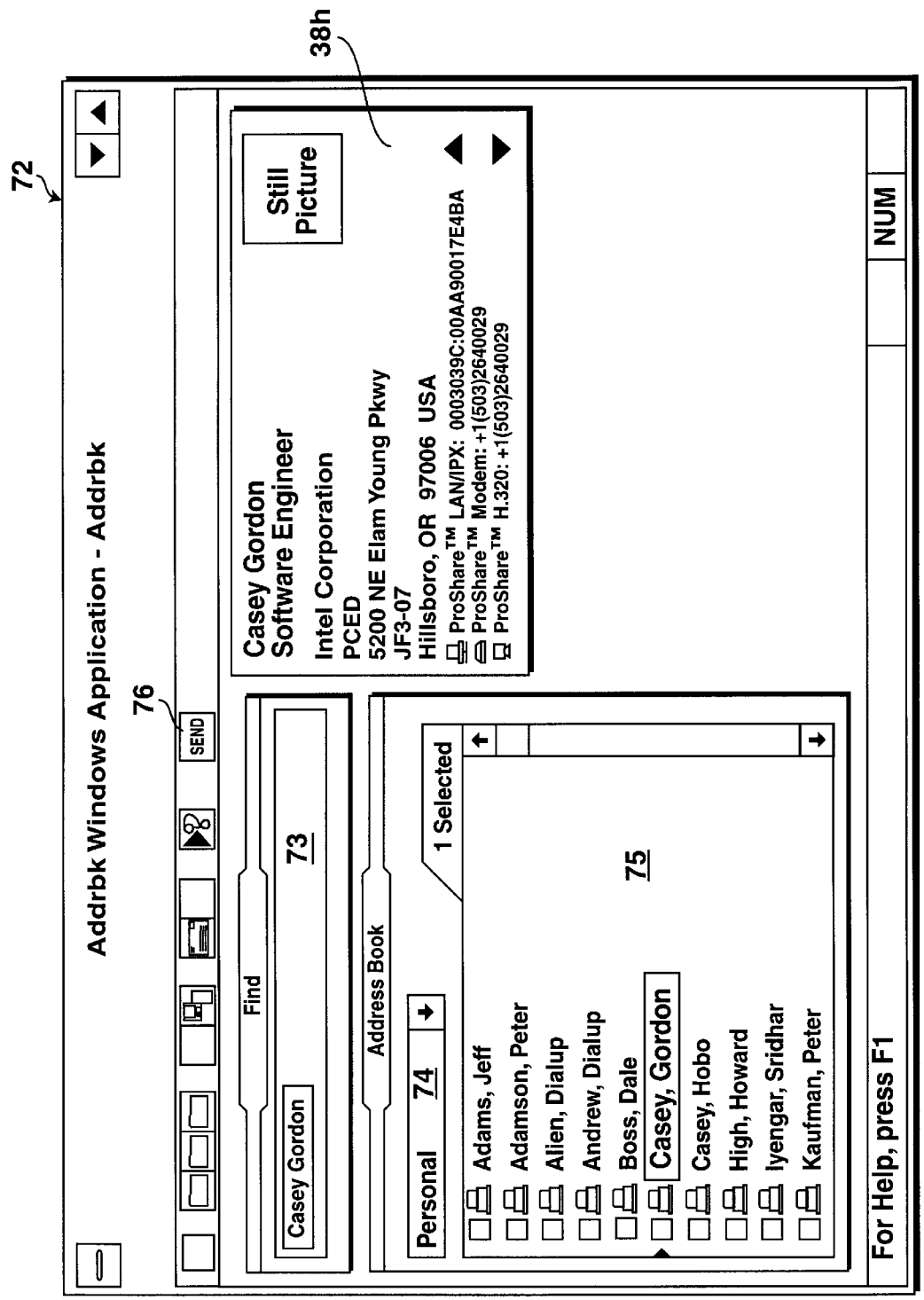
FIG. 5 illustrates one embodiment of the end user interfaces employed by the address service of FIG. 2 for retrieving and browsing saved bizcards during operation.

FIG. 5 illustrates the user interface employed by the functions incorporated in address services 30 for retrieval and browsing of saved bizcards. As shown, the bizcard function of address service 30 includes an address book/addressee selection window 72. Address book/addressee selection window 72 includes an addressee display area 75 where the user can make his/her addressee selection. As described earlier, the selected addressee is highlighted, the selected addressee's saved bizcard 38h (if it exists) is displayed. Additionally, address book/addressee selection window 72 also includes a first input area 73 for locating an addressee, and a second input area 74 for switching address book. The bizcard function of address service 30 for retrieving and browsing saved bizcards 38h may be implemented in a variety of manners, including but not limited to the embodiment disclosed in the above identified and incorporated by reference co-pending patent application.

Figure 6A:
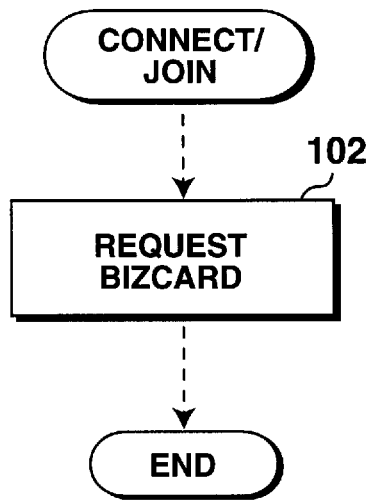
FIGS. 6a–6d illustrate the operational flow of one embodiment of the bizcard request management and send/receive functions of the conference manager of FIG. 2.
Figure 6B:
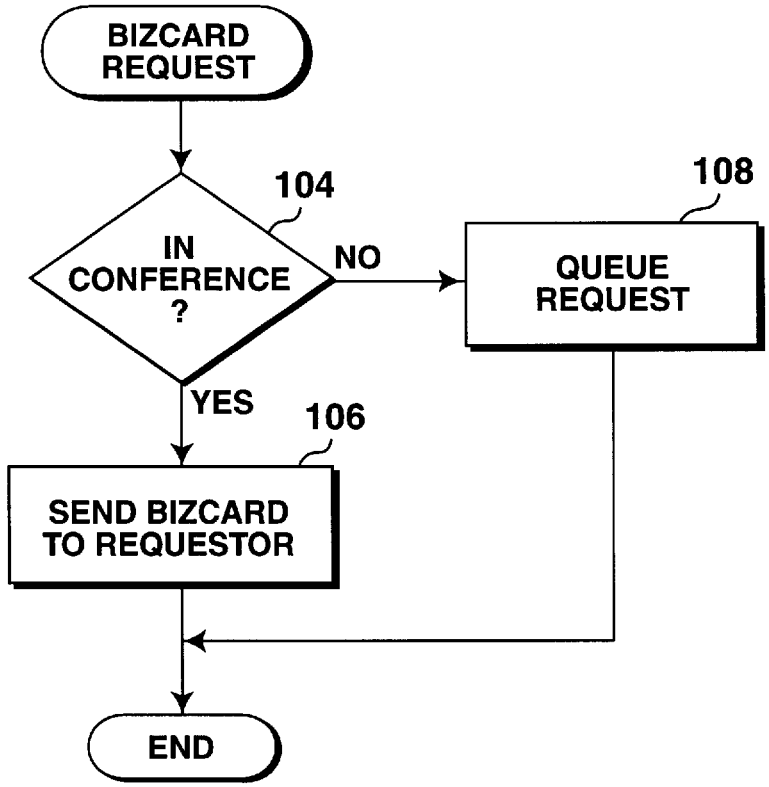

Referring now to FIGS. 6a–6d, the operational flow of one embodiment of the request management and send/receive functions of conference manger 26 is shown. As shown in FIG. 6a, in response to a conference participant "connecting" or "joining" event, in addition to the normal connect/join processing, conference manager 26 issues a request to the connecting/joining conference participant for his/her bizcard, step 102. As shown in FIG. 6b, in response to a bizcard request event, the request management function of conference manager 26 first checks the state of GPPC application 22 and determines whether the user is in conference, step 104. If the user is in conference, then the send/receive function is invoked to send the user's bizcard 38 to the requester, step 106. Otherwise, the request management function queues the bizcard request in its request queue, step 108. As will be appreciated by those skilled in the art, in lieu of an exclusive bizcard request queue, a multi-purpose request queue wherein the nature of a request is identifiable may also be used.

Figure 6C:
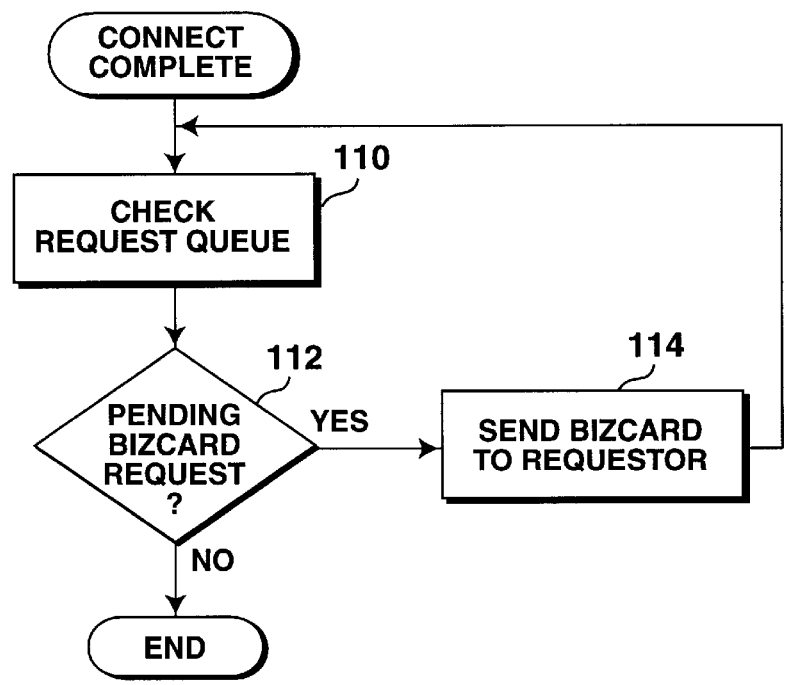
Figure 6D:
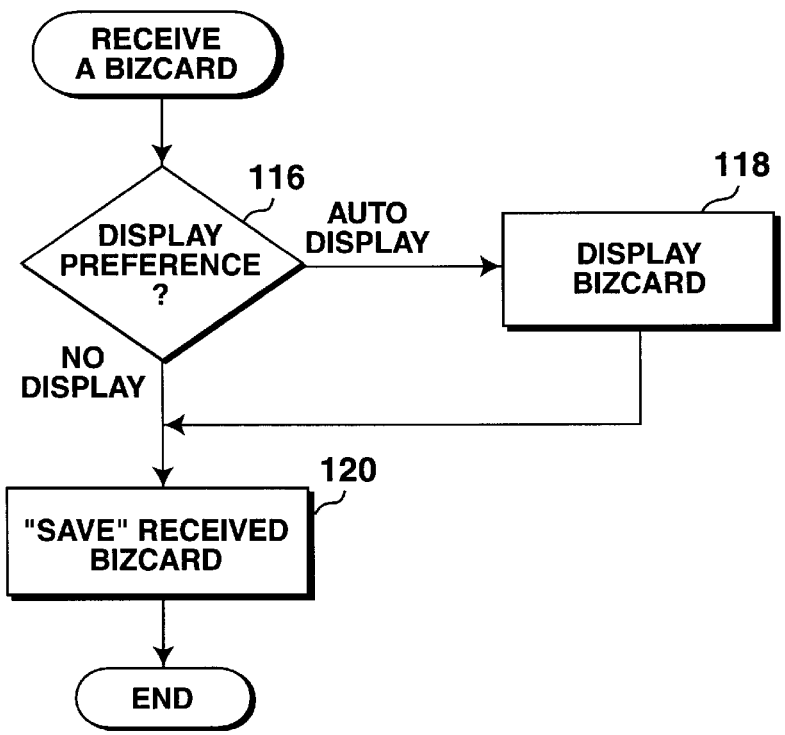

As shown in FIG. 6c, in response to a connection processing complete event, i.e. the GPPC application is in a state of "in conference", the request management function of conference manager 26 checks the request queue to determine whether there are any pending bizcard requests, step 110. If there are no pending request, the request management function takes no further action. On the other hand, if there is at least one pending bizcard request, for each pending bizcard request, the send/receive function is invoked to send the user's bizcard 38 to the requester, step 114. The process is repeated until all bizcard requests have been answered, steps 110 and 114. As shown in FIG. 6d, in response a bizcard receipt event, the send/receive function of conference manager 26 first checks the user's display preference setting, step 116. If the preference setting is set to "auto display", the send/receive function causes the received bizcard 38 to be rendered, step 118. Regardless of the preference setting, preferably, the send/receive function also saves the received bizcard for subsequent retrieval, if the user does not already has a copy of the received bizcard, step 120. Furthermore, the "saving" into a permanent storage is preferably deferred until conference termination. By deferring saving into permanent storage, more CPU cycles would be available for performing real time processing of audio and video data. Moreover, it is more efficient for a multi-point conference to save all received bizcards 38 at the same time, as opposed to saving the bizcards 38 as they are received, since presumably each saving will require file opening and closing.

Lastly, as will be appreciated by those skilled in the art, the two-phased approach to exchanging bizcards among conference participants of the present invention described above is transparent to the conference participants. In other words, from the conference participants' perspectives, the behavior for exchanging business cards in face-to-face conferences is modeled in like manner, except for the fact that the behavior is modeled more reliably notwithstanding wider performance differences among the participant PCs.

Thus, a method and apparatus for exchanging electronic business card exchanges in a point-to-point or a multi-point personal computer conference has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A personal computer (PC) conferencing system comprising a general purpose personal conferencing (GPPC) application having a conference manager that automatically requests a business card data structure from a connecting or a joining conference participant responsive to a connect or a join event denoting the connecting or joining of another PC conferencing system to the PC conferencing system in a point-to-point computer conference or the joining of another PC conferencing system to a multi-point computer conference, of which the PC conferencing system is a current participant respectively, wherein the conference manager further includes a first function for managing business card data structure requests from other PC conferencing systems, and a second function for sending and receiving business card data structures between the PC conferencing system and other PC conferencing systems in coordination with the first function, and, the business card data structure includes information commonly found in business cards and, the information are rendered on each of the PC conferencing systems in a format that resembles a business card.

2. The PC conferencing system as set forth in claim 1, wherein responsive to each business card data structure request, the first function either queues the business card data structure request if the PC conferencing system is not in conference, or in cooperation with the second function, cause the requested business card data structure to be sent to the requesting PC conferencing system if the PC conferencing system is in conference.

3. The PC conferencing system as set forth in claim 2, wherein responsive to each completion of connection processing by the PC conferencing system, the first function checks to determine whether there are any pending business card data structure requests, and if there is at least one pending business card data structure request, the first function in cooperation with the second function cause the PC conferencing system's business card data structure to be sent to each of the other PC conferencing systems whose business card data structure requests were pending.

4. A point-to-point personal conferencing system comprising a first and a second PC conferencing system coupled to each other, the first and second PC conference systems having a first and a second general purpose personal conference (GPPC) application respectively, wherein each GPPC application includes a conference manager that automatically requests a business card data structure from the other PC conferencing system whenever the other PC conferencing system request to connect to the PC conferencing system for a point-to-point computer conference, each of the conference managers further includes a first function for managing business card data structure requests from other PC conferencing systems, and a second function for sending and receiving business card data structures with the other PC conferencing system in coordination with the first function, and, the business card data structure includes information commonly found in business cards and, the information are rendered on each of the PC conferencing systems in a format that resembles a business card.

5. The point-to-point conferencing system as set forth in claim 4, wherein responsive to each business card data structure request received by one of the PC conferencing systems, the corresponding first function either queues the business card data structure request if the receiving PC conferencing system is not in conference, or in cooperation with the second function, cause the requested business card data structure to be sent to the requesting PC conferencing system if the receiving PC conferencing system is in conference.

6. The point-to-point personal conferencing system as set forth in claim 5, wherein responsive to each completion of connection processing of one of the PC conferencing systems, the corresponding first functions checks to determine whether there is a business card data structure request from the other PC conferencing system that is pending, and if there is a business card data structure request from the other PC conferencing system pending, the first function in cooperation with the second function cause the PC conferencing system's business card data structure to be sent to the other PC conferencing system.

7. A multi-point personal conferencing system comprising a first, a second and a third PC conferencing system, and a multi-point control unit (MCU), the first, second and third PC conferencing systems being coupled to the MCU and having a first, a second and a third general purpose personal conference (GPPC) application respectively, wherein each of the GPPC applications includes a conference manager that automatically requests a business card data structure from a joining conference participant responsive to a join event denoting the joining of one of the other PC conferencing systems to the PC conferencing system in a multi-point computer conference, each of the conference managers further includes a first function for managing business card data structure requests from the other PC conferencing systems, and a second function for sending and receiving business card data structures between the PC conferencing system and the other PC conferencing systems in coordination with the first function, and the business card data structure includes information commonly found in business cards and, the information are rendered on each of the PC conferencing systems in a format that resembles a business card.

8. The multi-point conferencing system as set forth in claim 7, wherein responsive to each business card data structure request received by one of the PC conferencing systems, the corresponding first function either queues the business card data structure request if the receiving PC conferencing system is not in conference, or in cooperation with the second function, cause the requested business card data structure to be sent to the requesting PC conferencing system if the receiving PC conferencing system is in conference.

9. The multi-point personal conferencing system as set forth in claim 8, wherein responsive to each completion of connection processing of one of the PC conferencing systems, the corresponding first functions checks to determine whether there are pending business card data structure requests from the other PC conferencing systems, and if there is at least one business card data structure request from one of the other PC conferencing systems pending, the first function in cooperation with the second function cause the PC conferencing system's business card data structure to be sent to each of the PC conferencing systems whose request for the PC conferencing system's business card data structure is pending.

10. A storage medium comprising a general purpose personal conferencing (GPPC) application to be installed on a personal computer (PC) conferencing system, the GPPC application having a conference manager that automatically requests a business card data structure from a connecting or a joining conference participant responsive to a connect or a join event denoting the connecting or joining of another PC conferencing system to the PC conferencing system in a point-to-point computer conference or the joining of another PC conferencing system to a multi-point computer conference, of which the PC conferencing system is a current participant respectively, during operation wherein the conference manager further includes a first function for managing business card data structure requests from other PC conferencing systems, and a second function for sending and receiving business card data structures between the PC conferencing system and other PC conferencing systems in coordination with the first function, and, the business card data structure includes information commonly found in business cards and, the information are rendered on each of the PC conferencing systems in a format that resembles a business card.

11. The storage medium as set forth in claim 10, wherein during operation, responsive to each business card data structure request, the first function either queues the business card data structure request if the PC conferencing system is not in conference, or in cooperation with the second function, cause the requested business card data structure to be sent to the requesting PC conferencing system if the PC conferencing system is in conference.

12. The storage medium as set forth in claim 10, wherein during operation, responsive to each completion of connection processing by the PC conferencing system, the first function checks to determine whether there are any pending business card data structure requests, and if there is at least one pending business card data structure request, the first function in cooperation with the second function cause the PC conferencing system's business card data structure to be sent to each of the other PC conferencing systems whose business card data structure requests were pending.

13. In a personal computer (PC) conferencing system, a method for exchanging electronic business cards with another PC conferencing system, the method comprising the steps of:

a) automatically requesting a first business card data structure from the other PC conferencing system responsive to a connecting or joining event denoting the other PC conferencing system's connecting/joining the PC conferencing system in a computer conference, where the first business card data structure is to contain common business card information about a first user of the other PC conferencing system, and the information when received by the PC conferencing system are to be rendered on the receiving PC conferencing system in a format that resembles a business card; and b) conditionally answering a request for a second business card structure from the other PC conferencing system, depending on a conferencing state of the PC conferencing system, where the second business card data structure is to contain common business card information about a second user of the PC conferencing system, and the information when received by the other PC conferencing system are to be rendered on the other PC conferencing system in a format that resembles a business card.

14. The method as set forth in claim 13, wherein step (b) comprises queuing the other PC conferencing system's request if the conference state of the PC conferencing system denotes the PC conferencing system as not in conference; and step (b) comprises sending the second business card data structure to the other PC conferencing system if the conference state of the PC conferencing system denotes the PC conferencing system as in conference.

15. The method as set forth in claim 14, wherein the method further comprises step (c) responsive to each completion of connection processing by the PC conferencing system, checking to determine whether there are any queued pending requests for the second business card data structure, and if there is at least one queued pending business card data structure request, answering each queued pending request.

* * * * *